(12) United States Patent
Onomatsu et al.

(10) Patent No.: US 7,570,224 B2
(45) Date of Patent: Aug. 4, 2009

(54) ANTENNA APPARATUS AND ANTENNA SYSTEM

(75) Inventors: Takehiro Onomatsu, Daito (JP); Shusuke Narita, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 211 days.

(21) Appl. No.: 11/691,174

(22) Filed: Mar. 26, 2007

(65) Prior Publication Data
US 2007/0262913 A1 Nov. 15, 2007

(30) Foreign Application Priority Data
Mar. 27, 2006 (JP) ............... 2006-085718

(51) Int. Cl.
*H01Q 3/24* (2006.01)
(52) U.S. Cl. .................. 343/876; 455/277.1
(58) Field of Classification Search ........... 343/725, 343/876; 725/100; 455/277.1
See application file for complete search history.

(56) References Cited

U.S. PATENT DOCUMENTS

| | | | |
|---|---|---|---|
| 3,478,361 A | 11/1969 | Middlemark | |
| 5,313,660 A * | 5/1994 | Lindenmeier et al. | ....... 455/135 |
| 5,771,015 A | 6/1998 | Kirtman et al. | |
| 6,697,610 B1 | 2/2004 | Tait | |
| 2003/0228857 A1 * | 12/2003 | Maeki | ............. 455/278.1 |
| 2006/0003693 A1 | 1/2006 | Onomatsu et al. | |
| 2006/0020986 A1 | 1/2006 | Tsukamoto | |
| 2006/0125708 A1 * | 6/2006 | Narita | ............. 343/818 |

FOREIGN PATENT DOCUMENTS

| | | |
|---|---|---|
| EP | 1 035 659 A1 | 9/2000 |
| JP | 55-96703 A | 7/1980 |
| JP | 2001-86019 A | 3/2001 |
| JP | 2001-94899 A | 4/2001 |

OTHER PUBLICATIONS

European Search Report dated Jul. 16, 2007 (Nine (9) pages).

* cited by examiner

*Primary Examiner*—Tan Ho
(74) *Attorney, Agent, or Firm*—Crowell & Moring LLP

(57) ABSTRACT

Disclosed a antenna apparatus including: a first antenna having a fixed directivity for receiving a signal in a first frequency band; a second antenna capable of switching a directivity thereof at a time of receiving a signal in a second frequency band; a judgment section to judge which of the signal in the first frequency band and the signal in the second frequency band a television broadcast signal corresponding to a tuned channel is; and a selection section to select the first antenna as an antenna to receive the television broadcast signal corresponding to the tuned channel when the television broadcast signal is judged to be the signal in the first frequency band, and to select the second antenna as the antenna to receive the television broadcast signal when the television broadcast signal is judged to be the signal in the second frequency band.

3 Claims, 3 Drawing Sheets

ANTENNA APPARATUS AND ANTENNA SYSTEM

BACKGROUND OF THE INVENTION

1. Field of the Invention

The present invention relates to an antenna apparatus and an antenna system.

2. Description of Related Art

In earlier development, for example, a viewer has adjusted the direction and the like of an antenna, referring to an image displayed on a display unit so that the antenna may face the optimum reception direction at the time of the reception of a television broadcast signal (hereinafter referred to as a "TV broadcast signal") with an antenna system. However, the adjustment method has a problem of being very troublesome. Consequently, there have been proposed, for example, the antenna system equipped with an indicator that can display the reception situation of a TV broadcast signal so as to enable a viewer to manually adjust the direction and the like of the antenna, with the viewer referring to a reception situation displayed on the indicator (see, for example, Japanese Patent Application Publication Laid-open No. 2001-94899), the antenna system capable of automatically adjusting the direction and the like of the antenna when a viewer requests the adjustment (see, for example, Japanese Patent Application Publication Laid-open No. 2001-86019), and the like.

Furthermore, there has been also proposed the antenna system equipped with an antenna apparatus including an antenna capable of automatically switching the directivity thereof whenever a viewer specifies a desired channel (called as a "smart antenna" as a popular name) and a television receiver. To put it concretely, for example, the antenna apparatus is controlled by the television receiver based on a predetermined standard such as EIA/CEA-909 to switch the directivity and the like of the smart antenna.

Now, TV broadcast signals can be classified to the signals in a first frequency band (for example, the VHF band) (hereinafter referred to as "VHF signals") and the signals in a second frequency band (for example, the UHF band) (hereinafter referred to as "UHF signals") based on their frequency bands, and the configuration of an antenna for VHF signal reception greatly differs from that of an antenna for UHF signal reception. Consequently, for example, if it is tried to modify the configuration of the aforesaid smart antenna so as to be able to receive both the VHF signals and the UHF signals, then the problem of the enlargement in size of the smart antenna is caused. On the other hand, the reason why the smart antenna has many directivity directions is to deal with the case where transmission towers for transmitting TV broadcast signals are built to be dotted about, and the like. However, the broadcasting in the VHF band has been reduced with the recent transition from the analog broadcasting to the digital broadcasting, and the possibility that the VHF signals are transmitted from more directions is little in the future. That is, the need to switch the directivity of an antenna at the time of receiving a VHF signal is little, and it is sufficient for an antenna capable of receiving both of the VHF signals and the UHF signals to have the ability of switching the directivity thereof at least at the time of receiving a UHF signal.

SUMMARY OF THE INVENTION

It is an object of the present invention to achieve the miniaturization and the simplification of an antenna apparatus including an antenna to receive the signals in a first frequency band and an antenna to receive the signals in a second frequency band, and of an antenna system equipped with the antenna apparatus.

In order to accomplish the above object, in accordance with a first aspect of the invention, an antenna system comprising an antenna apparatus and a receiver connected to each other, wherein the antenna apparatus includes: a first antenna having a fixed directivity for receiving a signal in a first frequency band of television broadcast signals; a second antenna to which the first antenna is detachably attached, the second antenna being capable of switching a directivity thereof at a time of receiving a signal in a second frequency band of the television broadcast signals; an acquisition section to acquire channel information from the receiver; a judgment section to judge whether a television broadcast signal corresponding to a channel number included in the channel information acquired by the acquisition section is the signal in the first frequency band or the signal in the second frequency band; a selection section to select the first antenna as an antenna to receive the television broadcast signal, when the television broadcast signal corresponding to the channel number included in the channel information acquired by the acquisition section is judged to be the signal in the first frequency band by the judgment section, and to select the second antenna as the antenna to receive the television broadcast signal, when the television broadcast signal corresponding to the channel number included in the channel information acquired by the acquisition section is judged to be the signal in the second frequency band by the judgment section; and a switch section to switch the directivity of the second antenna based on direction information included in the channel information acquired by the acquisition section when the selection section selects the second antenna, and wherein the receiver includes a transmission section to transmit the channel information to the antenna apparatus.

According to the aspect, the antenna apparatus includes the first antenna having the fixed directivity for receiving the signal in the first frequency band of the television broadcast signals, and the second antenna capable of switching a directivity thereof at the time of receiving the signal in the second frequency band of the television broadcast signals. Consequently, for example, if an antenna is configured so as to be able to switch the directivity thereof at the time of the reception of the signal in the first frequency band (for example, a VHF signal), then it becomes necessary to make the antenna larger in size than the one in the case where the antenna is configured so as to be able to switch the directivity thereof at the time of the reception of the signal in the second frequency band (for example, a UHF signal), but, if the antenna has the directivity fixed at the time of the reception of the signal in the first frequency band (for example, the VHF signal) as the first antenna, there is no necessity of making the antenna large in size, and consequently the miniaturization and the simplification of the antenna apparatus equipped in the antenna system can be achieved.

Moreover, the antenna apparatus can acquire the channel information from the receiver with the acquisition section, and it is possible to judge whether the television broadcast signal corresponding to the channel number included in the channel information acquired by the acquisition section is the signal in the first frequency band or the signal in the second frequency band by the judgment section. When the television broadcast signal corresponding to the channel number included in the channel information acquired by the acquisition section is judged to be the signal in the first frequency band by the judgment section, the first antenna can be selected as the antenna to receive the television broadcast signal by the selection section. When the television broadcast signal corresponding to the channel number included in the channel information acquired by the acquisition section is judged to be the signal in the second frequency band, the second antenna can be selected as the antenna to receive the television broadcast signal by the selection section. When the selection section selects the second antenna, it is possible to switch the directivity of the second antenna by the switch section based on the direction information included in the channel information acquired by the acquisition section. The receiver can transmit the channel information to the antenna apparatus by the transmission section. That is, the antenna apparatus can be efficiently controlled.

Moreover, because the first antenna is freely attachable and detachable for the second antenna, the first antenna can be detached from the antenna apparatus, and consequently the still more miniaturization of the antenna apparatus can be achieved.

In accordance with a second aspect of the invention, an antenna apparatus comprises: a first antenna having a fixed directivity for receiving a signal in a first frequency band of television broadcast signals; a second antenna capable of switching a directivity thereof at a time of receiving a signal in a second frequency band of the television broadcast signals; a judgment section to judge whether a television broadcast signal corresponding to a tuned channel is the signal in the first frequency band or the signal in the second frequency band; and a selection section to select the first antenna as an antenna to receive the television broadcast signal when the television broadcast signal corresponding to the tuned channel is judged to be the signal in the first frequency band by the judgment section, and to select the second antenna as the antenna to receive the television broadcast signal when the television broadcast signal corresponding to the tuned channel is judged to be the signal in the second frequency band by the judgment section.

According to the aspect, the antenna apparatus includes the first antenna having the fixed directivity for receiving the signal in the first frequency band of the television broadcast signals, and the second antenna capable of switching the directivity thereof at the time of receiving the signal in the second frequency band of the television broadcast signals. Consequently, for example, if an antenna is configured so as to be able to switch the directivity thereof at the time of the reception of the signal in the first frequency band (for example, a VHF signal), then it becomes necessary to make the antenna larger in size than the one in the case where the antenna is configured so as to be able to switch the directivity thereof at the time of the reception of the signal in the second frequency band (for example, a UHF signal), but, if the antenna has the directivity fixed at the time of the reception of the signal in the first frequency band (for example, the VHF signal) as the first antenna, there is no necessity of making the antenna large in size, and consequently the miniaturization and the simplification of the antenna apparatus can be achieved.

Moreover, it is possible to judge whether the television broadcast signal corresponding to the tuned channel is the signal in the first frequency band or the signal in the second frequency band by the judgment section. When the television broadcast signal corresponding to the tuned channel is judged to be the signal in the first frequency band by the judgment section, the first antenna can be selected as the antenna to receive the television broadcast signal by the selection section. When the television broadcast signal corresponding to the tuned channel is judged to be the signal in the second frequency band, the second antenna can be selected as the antenna to receive the television broadcast signal by the selection section. That is, the antenna apparatus can be efficiently controlled.

Preferably, the first antenna is freely attachable and detachable for the second antenna.

Thereby, it is of course that the similar advantageous effect as those of the above aspects, and, because the first antenna is freely attachable and detachable for the second antenna, the first antenna can be detached from the antenna apparatus, and consequently the still more miniaturization of the antenna apparatus can be achieved.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE PREFERRED EMBODIMENTS

In the following, preferred embodiments of an antenna apparatus of the present invention and an antenna system equipped with the antenna apparatus will be described in detail by referring to the accompanying drawings.

Incidentally, the scope of the invention is not limited to the shown examples.

<Configuration of Antenna System>

Figure 1:
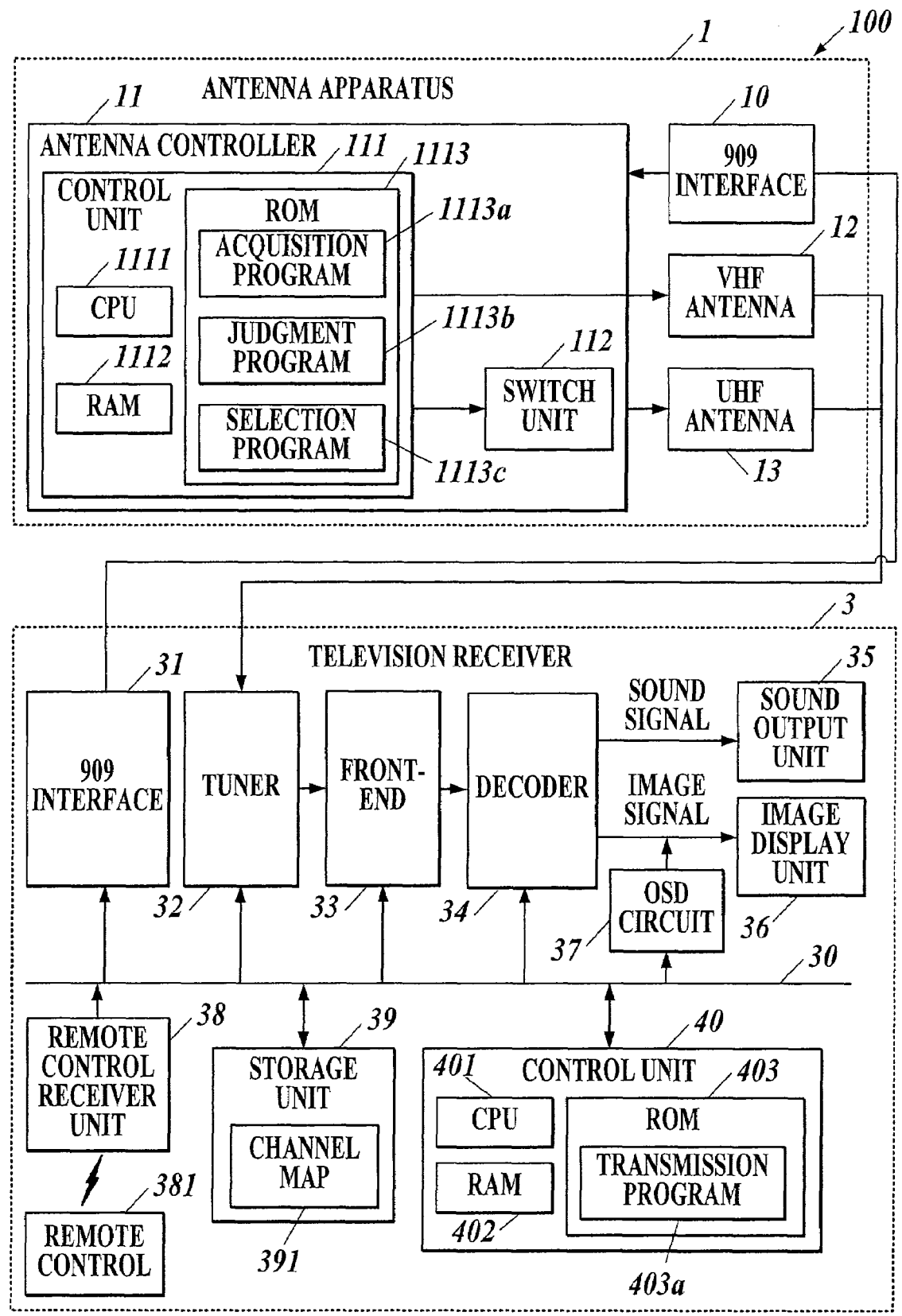
FIG. 1 is a block diagram showing the functional configuration of an antenna system of a preferred embodiment of the present invention.

First, the configuration of an antenna system 100 will be described by referring to FIG. 1.

The antenna system 100 is composed of, for example, an antenna apparatus 1, a television receiver 3 as a receiver connected to the antenna apparatus 1, and the like.

The antenna apparatus 1 and the television receiver 3 are connected to each other through, for example, interfaces for performing communications based on a predetermined communication method (for example, EIA/CEA-909 or the like) (hereinafter referred to as a "909 interface").

Moreover, the antenna apparatus 1 is configured so as to receive, for example, a television broadcast signal (hereinafter referred to as a "TV broadcast signal"), and the television receiver 3 is configured so as to output, for example, a sound and an image based on the TV broadcast signal received by the antenna apparatus 1.

<Configuration of Antenna Apparatus>

Next, the configuration of the antenna apparatus 1 will be described by referring to FIG. 1.

The antenna apparatus 1 is composed of, for example, a 909 interface 10, an antenna controller 11, a VHF antenna 12 as a first antenna having a fixed directivity for receiving a signal in a first frequency band (for example, a VHF signal) of television broadcast signals, a UHF antenna 13 as a second antenna capable of switching a directivity thereof at the time of receiving a signal in a second frequency band (for example, a UHF signal) of the TV broadcast signals, and the like.

Figure 2:
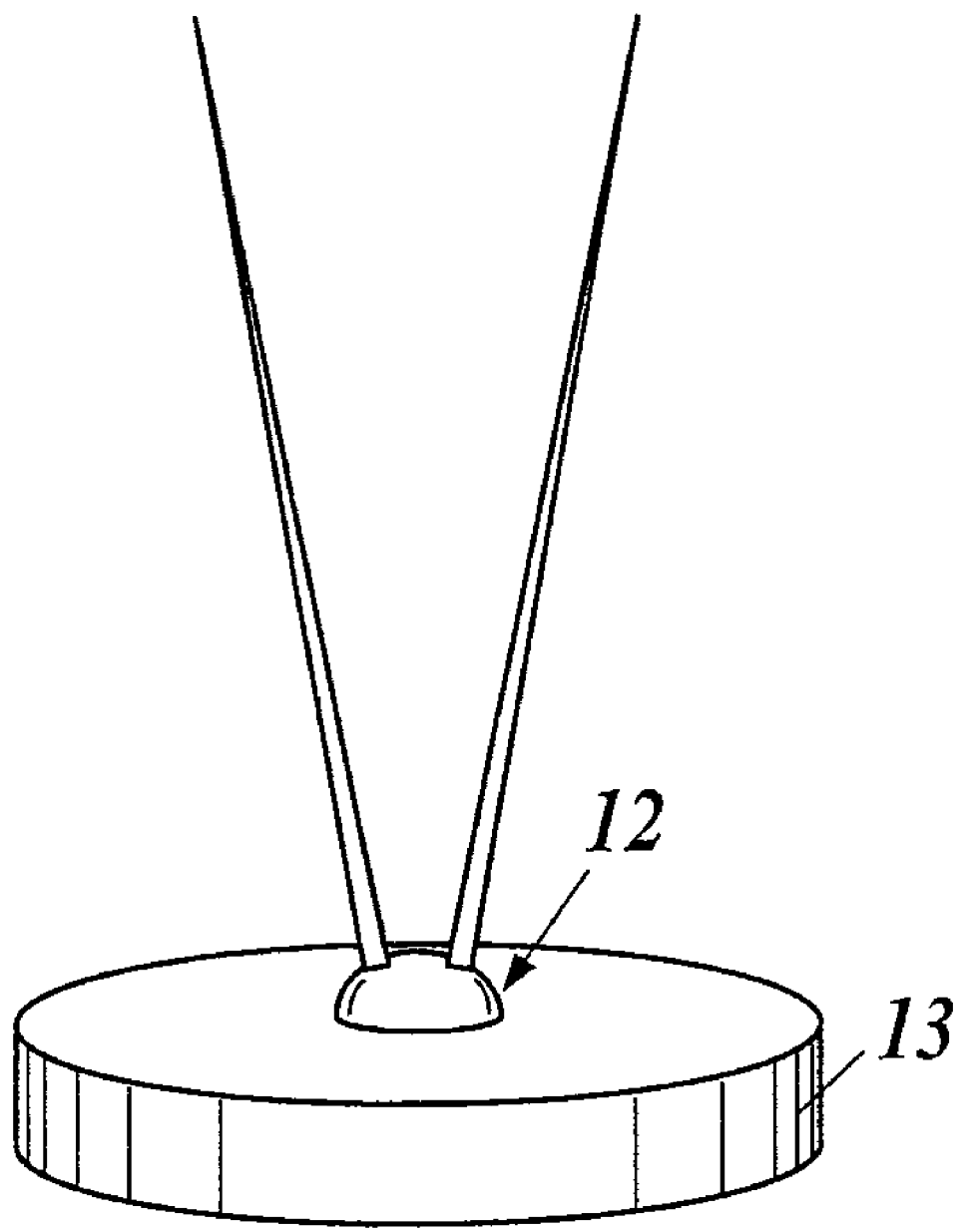
FIG. 2 is a view showing the configuration of the principal part of the main body unit of the antenna shown in FIG. 1.

The VHF antenna 12 and the UHF antenna 13 are coupled to each other in the state of being freely attachable and detachable, as shown in FIG. 2, for example.

The 909 interface 10 is connected to a 909 interface 31 (described below) of the television receiver 3, for example, and performs communications based on the predetermined communication method (for example, EIA/CEA-909 or the like) with the 909 interface 31 (described below) of the television receiver 3. Then, the 909 interface 10 receives channel information (described below) and the like for controlling the antenna apparatus 1 from the television receiver 3, and outputs the received channel information to the antenna controller 11.

The antenna controller 11 is equipped with, for example, a control unit 111, a switch unit 112 and the like.

The control unit 111 is composed of, for example, a central processing unit (CPU) 1111, a random access memory (RAM) 1112, a read only memory (ROM) 1113 and the like.

The CPU 1111 performs various control operations in accordance with various processing programs for the antenna controller 11, which programs are stored in the ROM 1113.

The RAM 1112 includes a program storage region for expanding the processing programs and the like that to be executed by the CPU 1111, a data storage region for storing input data, processing results which are generated when the aforesaid processing programs are executed, and the like.

The ROM 1113 stores the system program that can be executed by the antenna controller 11, the various processing programs that can be executed on the system program, the data that is used when the various processing programs are executed, the data of the processing results that have been processed by the CPU 1111, and the like.

Incidentally, the programs are stored in the ROM 1113 in the form of the program codes that a computer can read.

To put it concretely, the ROM 1113 stores, for example, an acquisition program 1113a, a judgment program 1113b, a selection program 1113c and the like.

The acquisition program 1113a enables the CPU 1111 to realize, for example, the function of acquiring the channel information transmitted from the 909 interface 31 (described below) of the television receiver 3.

The CPU 1111 functions as an acquisition section by executing the acquisition program 1113a.

Now, the channel information is, for example, the information corresponding to the channel (virtual channel) tuned by a user, and, for example, the information including a physical channel number, the direction information pertaining to the direction of the directivity of an antenna, the gain information pertaining to the gain of the antenna, and the like.

To put it concretely, the physical channel number is, for example, the information to be used by the CPU 1111 that executes the judgment program 1113b.

Moreover, the direction information is, for example, the information to be used by the switch unit 112.

Moreover, the gain information is, for example, the information to be used by the VHF antenna 12 and the UHF antenna 13.

The judgment program 1113b enables the CPU 1111 to realize, for example, the function of judging whether the TV broadcast signal corresponding to the physical channel number as the channel number included in the channel information acquired by the CPU 1111, which has executed the acquisition program 1113a, is a VHF signal or a UHF signal, i.e. the function of judging whether the TV broadcast signal corresponding to the channel tuned by a user is a VHF signal or a UHF signal.

Hereupon, the physical channel number is, for example, given so as to correspond to the frequency value of the frequency band in which a TV broadcast signal exists, and a TV broadcast signal exists in a frequency band having a larger frequency value as the TV broadcast signal has a larger physical channel number. Moreover, a UHF signal exists in a frequency band having a larger frequency value in comparison with that of a frequency band in which a VHF signal exists. Consequently, it can be judged based on a physical channel number whether a TV broadcast signal is a VHF signal or a UHF signal.

To put it concretely, for example, when the physical channel number included in the channel information acquired by the CPU 1111, which has executed the acquisition program 1113a, is equal to a predetermined value (hereinafter referred to as "α") or less, the CPU 1111 judges that the TV broadcast signal is a VHF signal, and, when the physical channel number is larger than "α", the CPU 1111 judges that the TV broadcast signal is a UHF signal.

The CPU 1111 functions as a judgment unit by executing the judgment program 1113b.

The selection program 1113c enables the CPU 1111 to realize the function of: for example, when the TV broadcast signal corresponding to the physical channel number included in the channel information acquired by the CPU 1111, which has executed the acquisition program 1113a, is judged to be a VHF signal by the CPU 1111, which has executed the judgment program 1113b, the CPU 1111 selects the VHF antenna 12 as the antenna to receive the TV broadcast signal; and, when the TV broadcast signal corresponding to the physical channel number included in the channel information acquired by the CPU 1111, which has executed the acquisition program 1113a, is judged to be a UHF signal, the CPU 1111 selects the UHF antenna 13 as the antenna to receive the TV broadcast signal; namely, the function of: when the TV broadcast signal corresponding to the channel tuned by a user is judged to be a VHF signal by the CPU 1111, which has executed the judgment program 1113b, the CPU 1111 selects the VHF antenna 12 as the antenna to receive the TV broadcast signal; and, when the TV broadcast signal corresponding to the channel tuned by a user is judged to be a UHF signal by the CPU 1111, the CPU 1111 selects the UHF antenna 13 as the antenna to receive the TV broadcast signal.

The CPU 1111 functions as a selection section by executing such a selection program 1113c.

The switch unit 112, for example, as a switch section, switches the directivity of the UHF antenna 13 based on the direction information included in the channel information acquired by the CPU 1111, which has executed the acquisition program 1113a, in accordance with a control signal input from the control unit 111, when the UHF antenna 13 is selected by the CPU 1111, which has executed the selection program 1113c.

The VHF antenna 12 is, for example, an antenna configured so as to be able to receive a VHF signal of the TV broadcast signals transmitted from a transmission tower of a broadcast station and the like.

To put it concretely, the VHF antenna 12 is, for example, the so-called rabbit antenna as shown in FIG. 2, and is attached to the UHF antenna 13 in the state of being freely attachable and detachable.

The VHF antenna 12 is, for example, connected to a tuner 32 of the television receiver 3, and, when the VHF antenna 12 is selected by the CPU 1111 which has executed the selection program 1113c, the VHF antenna 12 receives a TV broadcast signal (a VHF signal).

The UHF antenna 13 is, for example, an antenna configured so as to be able to receive a UHF signal of the TV broadcast signals transmitted from a transmission tower of a broadcast station and the like.

To put it concretely, the UHF antenna 13 is, for example, the so-called smart antenna, and has a plurality of directivity directions (for example, 16 directions). When the directivity is switched into one direction among the plurality of directions by the switch unit 112, the UHF antenna shows larger sensitivities to the TV broadcast signals from the direction than the ones to the TV broadcast signals from the other directions.

The UHF antenna 13 is, for example, connected to the tuner 32 of the television receiver 3, and, when the UHF antenna 13 is selected by the CPU 1111, which has executed the selection program 1113*c*, and the directivity thereof is switched by the switch unit 112, the UHF antenna 13 receives a TV broadcast signal (a UHF signal).

To put it concretely, when the VHF antenna 12 and the UHF antenna 13 receive, for example, a TV broadcast signal, they perform the gain control processing, for example, amplifying the TV broadcast signal by the gain based on the gain information included in the channel information acquired by the CPU 1111, which has executed the acquisition program 1113*a*, and the like. Then they output the TV broadcast signal (to put it concretely, an radio frequency (RF) signal) to the tuner 32.

Incidentally, the VHF antenna 12 is only configured so as to have a receive sensitivity for the VHF band, and it is not unable to receive a UHF signal.

The UHF antenna 13 is similarly only to be configured so as to have a receive sensitivity for the UHF band, and it is not unable to receive a VHF signal. Consequently, the antenna apparatus 1 may be configured so that, for example, when the VHF antenna 12 is detached, the antenna apparatus 1, for example, automatically or manually perceives the state of the detachment of the VHF antenna 12, and that, if the TV broadcast signal corresponding to a tuned channel is a VHF signal, then the antenna apparatus 1 receives the VHF signal with the UHF antenna 13.

<Configuration of Television Receiver>

Next, the configuration of the television receiver 3 will be described by referring to FIG. 1.

The television receiver 3 is composed of, for example, a 909 interface 31, the tuner 32, a front-end 33, a decoder 34, an OSD circuit 37, a remote control receiver unit 38, a storage unit 39, a control unit 40 and the like. Each unit is connected to one another through a bus 30.

Moreover, the television receiver 3 is provided with, for example, a sound output unit 35 and an image display unit 36 that are connected to the decoder 34.

Moreover, the television receiver 3 is provided with, for example, a remote controller 381 (hereinafter referred to as a "RC 381") for the television receiver 3, which RC 381 can perform communications with the remote control receiver unit 38.

The 909 interface 31 is, for example, connected to the 909 interface 10 of the antenna apparatus 1, and, for example, performs the communications based on a predetermined communication method (for example, EIA/CEA-909 or the like) with the 909 interface 10 of the antenna apparatus 1 in accordance with a control signal input from the control unit 40 to transmit the channel information and the like for controlling the antenna apparatus 1 to it.

The tuner 32 is, for example, connected to the VHF antenna 12 and the UHF antenna 13 of the antenna apparatus 1, and, for example, acquires the TV broadcast signal corresponding to a channel (the one tuned by a user) among the TV broadcast signals output from the VHF antenna 12 and the UHF antenna 13 in accordance with a control signal input from the control unit 40 to output the acquired TV broadcast signal to the front-end 33.

The front-end 33 converts, for example, a TV broadcast signal output from the tuner 32 into an intermediate frequency signal in accordance with a control signal input from the control unit 40, and outputs the converted TV broadcast signal to the decoder 34.

The decoder 34, for example, performs the processing according to a predetermined file format (for example, Moving Picture Experts Group phase 2 (MPEG-2) format or the like) to a TV broadcast signal output from the front-end 33 in accordance with a control signal input from the control unit 40, and thereby separates the TV broadcast signal into a sound signal and an image signal and decodes them. Then, the decoder 34 outputs the decoded sound signal to the sound output unit 35, and outputs the decoded image signal to the image display unit 36.

The sound output unit 35 is, for example, speaker equipment or the like, and outputs the sound according to the sound data based on a sound signal output from the decoder 34.

The image display unit 36 is, for example, liquid crystal display equipment or the like, and displays the image according to the image data based on an image signal output from the decoder 34, and the image according to the image data based on an image signal output from the decoder 34 and synthesized with an OSD display signal (described below) by the OSD circuit 37.

The OSD circuit 37, for example, synthesizes an OSD display signal for allowing the image display unit 36 to perform a predetermined on-screen display (OSD) with an image signal output from the decoder 34 to the image display unit 36 in accordance with a control signal input from the control unit 40.

The remote control receiver unit 38, for example, receives various signals transmitted from the RC 381 to output the various kinds of data based on the received various signals to the control unit 40.

The RC 381 is operated by, for example, a user, and transmits a signal according to the operation to the remote control receiver unit 38.

To put it concretely, the RC 381, for example, includes channel keys, channel up/down keys and the like that are used at the time of specifying a tuned channel.

The storage unit 39 is made of, for example, a magnetic storage medium, an optical storage medium or a semiconductor memory.

To put it concretely, the storage unit 39 stores a channel map 391 and the like.

The channel map 391 stores, for example, channel information and the like.

To put it concretely, the channel map 391 stores, for example, virtual channel numbers assigned to the channel keys and the channel up/down keys of the RC 381, physical channel numbers, direction information pertaining to the direction of the directivity of an antenna, gain information pertaining to the gain of the antenna, and the like in the state in which they are associated with one another.

The information stored in the channel map 391 is, for example, determined in the initial setting processing of the antenna system 100 to be stored in the channel map 391.

The control unit 40 is, for example, equipped with a CPU 401, a RAM 402, a ROM 403 and the like.

The CPU 401 performs various control operations in accordance with the various processing programs for the television receiver 3 which processing programs are stored in the ROM 403.

The RAM 402 includes a program storage region for expanding a processing program and the like to be executed by the CPU 401, a data storage region for storing input data, processing results generated at the time of the execution of the aforesaid processing program, and the like.

The ROM 403 stores a system program that can be executed by the television receiver 3, various processing programs that can be executed on the system program, data to be used at the time of the execution of these various processing programs, the data of various results of the processing of the CPU 401, and the like. Incidentally, the programs are stored in the ROM 403 in the form of program codes that a computer can read.

To put it concretely, the ROM 403 stores, for example, a transmission program 403a and the like.

The transmission program 403a, for example, enables the CPU 401 to realize the function of transmitting channel information to the antenna apparatus 1 through the 909 interface 31.

To put it concretely, for example, when a channel is tuned by the operation of the channel keys or the channel up/down keys of the RC 381 by a user, the CPU 401 acquires the channel information (the physical channel number, the direction information, the gain information and the like) corresponding to the channel number (virtual channel number) of the channel from the channel map 391 of the storage unit 39, and transmits the acquired channel information to the antenna controller 11 of the antenna apparatus 1 through the 909 interface 31.

The CPU 401 functions as a transmission section by executing such a transmission program 403a.

<Channel Analysis Processing>

Figure 3:
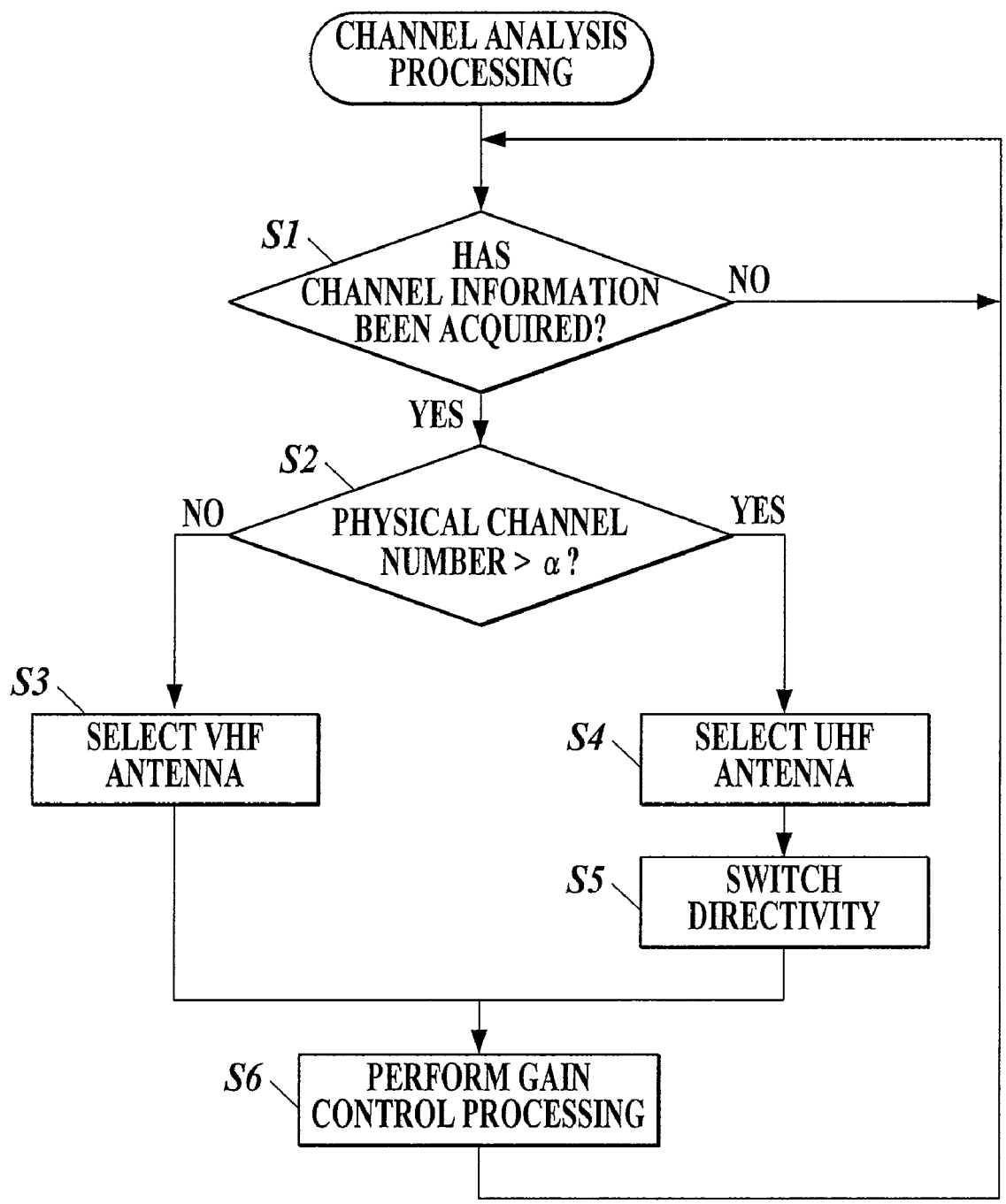
FIG. 3 is a flow chart for illustrating the processing pertaining to the analysis of a channel by an antenna apparatus of a preferred embodiment of the present invention.

Next, the processing pertaining to channel analysis by the antenna apparatus 1 will be described by referring to the flow chart of FIG. 3.

First, the CPU 1111 of the antenna controller 11 included in the antenna apparatus 1 judges whether the CPU 1111, which has executed the acquisition program 1113a, has acquired the channel information transmitted from the television receiver 3 or not (Step S1).

When the CPU 1111 judges that it has not acquired the channel information at Step S1 (Step S1; No), the CPU 1111 repeatedly performs the processing at Step S1.

On the other hand, when the CPU 1111 judges that it has acquired the channel information at Step S1 (Step S1; Yes), the CPU 1111 executes the judgment program 1113b to judge whether the physical channel number included in the acquired channel information is larger than "α" or not (Step S2).

When the CPU 1111 judges that the physical channel number is not larger than "α" at Step S2 (Step S2; No), that is, when the CPU 1111 judges that the TV broadcast signal corresponding to the physical channel number is a VHF signal, the CPU 1111 executes the selection program 1113c to select the VHF antenna 12 as the antenna to receive the TV broadcast signal (Step S3), and shifts the processing to that at Step S6.

On the other hand, when the CPU 1111 judges that the physical channel number is larger than "α" at Step S2 (Step S2; Yes), that is, when the CPU 1111 judges that the TV broadcast signal corresponding to the physical channel number is a UHF signal, the CPU 1111 executes the selection program 1113c to select the UHF antenna 13 as the antenna to receive the TV broadcast signal (Step S4), and switches the directivity of the UHF antenna 13 through the switch unit 112 based on the direction information included in the channel information acquired at Step S1 (Step S5) to shift the processing to that at Step S6.

Next, CPU 1111 controls the VHF antenna 12 or the UHF antenna 13 to perform the gain control processing of the TV broadcast signal received by the VHF antenna 12 or the UHF antenna 13, such as amplifying the TV broadcast signal by the gain based on the gain information included in the channel information acquired at Step S1 (Step S6), and repeatedly performs the processing on and after Step S1.

According to the aforesaid antenna apparatus 1 of the preferred embodiment of the present invention and the antenna system 100 provided with the antenna apparatus 1, the antenna apparatus 1 is provided with the VHF antenna 12 having the fixed directivity for receiving a VHF signal of TV broadcast signals, and the UHF antenna 13 capable of switching the directivity thereof at the time of the reception of a UHF signal of the TV broadcast signals.

Consequently, for example, if an antenna is configured so as to be able to switch the directivity thereof at the time of the reception of a VHF signal, it is necessary to make the antenna larger in size in comparison with that of the case where the antenna is configured so as to be able to switch the directivity thereof at the time of the reception of a UHF signal. However, if the directivity of the antenna is fixed at the time of the reception of a VHF signal like the VHF antenna 12, then it becomes unnecessary to make the antenna large in size, and consequently the miniaturization and the simplification of the antenna apparatus 1 provided in the antenna system 100 can be achieved.

Moreover, the antenna apparatus 1 can acquire channel information from the television receiver 3 with the CPU 1111, which has executed the acquisition program 1113a, and can judge whether the TV broadcast signal corresponding to the physical channel number included in the channel information acquired by the CPU 1111, which has executed the acquisition program 1113a, is a VHF signals or a UHF signal with the CPU 1111, which has executed the judgment program 1113b. When the TV broadcast signal corresponding to the physical channel number included in the channel information acquired by the CPU 1111, which has executed the acquisition program 1113a, is judged to be the VHF signal by the CPU 1111, which has executed the judgment program 1113b, the VHF antenna 12 can be selected as the antenna to receive the TV broadcast signal by the CPU 1111, which has executed the selection program 1113c. When the TV broadcast signal corresponding to the physical channel number included in the channel information acquired by the CPU 1111, which has executed the acquisition program 1113a, is judged to be the UHF signal, the UHF antenna 13 can be selected as the antenna to be receive the TV broadcast signal. When the UHF antenna 13 is selected in accordance with the selection program 1113c, the directivity of the UHF antenna 13 can be switched by the switch unit 112 based on the direction information included in the channel information acquired by the CPU 1111, which has executed the acquisition program 1113a, and the television receiver 3 can transmits the channel information to the antenna apparatus 1 through the 909 interface 31 by the CPU 401, which has executed the transmission program 403a. That is, the antenna apparatus 1 is efficiently controlled by the television receiver 3.

Moreover, because the VHF antenna 12 is freely attachable and detachable for the UHF antenna 13, it becomes possible to detach the VHF antenna 12 from the antenna apparatus 1, and consequently the still further miniaturization of the antenna apparatus 1 provided in the antenna system 100 can be achieved.

Incidentally, the present invention is not limited to the aforesaid embodiment, and can be suitably modified within the range of not departing from the spirit of the invention.

The entire disclosure of Japanese Patent Application No. 2006-085718 filed on Mar. 27, 2006, including description, claims, drawings and summary are incorporated herein by reference in its entirety.

What is claimed is:

1. An antenna system comprising an antenna apparatus and a receiver connected to each other,
   wherein the antenna apparatus includes:
   a first antenna having a fixed directivity for receiving a signal in a first frequency band of television broadcast signals;
   a second antenna to which the first antenna is detachably attached, the second antenna being capable of switching a directivity thereof at a time of receiving a signal in a second frequency band of the television broadcast signals;
   an acquisition section to acquire channel information from the receiver;
   a judgment section to judge whether a television broadcast signal corresponding to a channel number included in the channel information acquired by the acquisition section is the signal in the first frequency band or the signal in the second frequency band;
   a selection section to select the first antenna as an antenna to receive the television broadcast signal, when the television broadcast signal corresponding to the channel number included in the channel information acquired by the acquisition section is judged to be the signal in the first frequency band by the judgment section, and to select the second antenna as the antenna to receive the television broadcast signal, when the television broadcast signal corresponding to the channel number included in the channel information acquired by the acquisition section is judged to be the signal in the second frequency band by the judgment section; and
   a switch section to switch the directivity of the second antenna based on direction information included in the channel information acquired by the acquisition section when the selection section selects the second antenna, and
   wherein the receiver includes a transmission section to transmit the channel information to the antenna apparatus.

2. An antenna apparatus, comprising:
   a first antenna having a fixed directivity for receiving a signal in a first frequency band of television broadcast signals;
   a second antenna capable of switching a directivity thereof at a time of receiving a signal in a second frequency band of the television broadcast signals;
   a judgment section to judge whether a television broadcast signal corresponding to a tuned channel is the signal in the first frequency band or the signal in the second frequency band; and
   a selection section to select the first antenna as an antenna to receive the television broadcast signal when the television broadcast signal corresponding to the tuned channel is judged to be the signal in the first frequency band by the judgment section, and to select the second antenna as the antenna to receive the television broadcast signal when the television broadcast signal corresponding to the tuned channel is judged to be the signal in the second frequency band by the judgment section.

3. The antenna apparatus according to claim 2, wherein the first antenna is freely attachable and detachable for the second antenna.

* * * * *